June 21, 1927.

A. SCALA

VEHICLE

Filed March 2, 1926

1,633,279

INVENTOR
Angelo Scala
BY
Stockbridge & Borst
ATTORNEYS

Patented June 21, 1927.

1,633,279

UNITED STATES PATENT OFFICE.

ANGELO SCALA, OF BROOKLYN, NEW YORK.

VEHICLE.

Application filed March 2, 1926. Serial No. 91,702.

My invention relates to auxiliary transportation devices susceptible of attachment to vehicles, such as side cars for motorcycles and the like. While, in many respects, my invention is of general application to devices of this character, regardless of the article or load to be transported, in other respects, it is of special utility in overland transportation of small boats, such as canoes and rowboats.

One of the objects of my invention is to provide a side car construction, which will be of universal service in accommodating boats of various sizes and various distributions of weight.

Another object of the invention is the provision of maximum relief to the boat or other load from the jars and vibrations incident to the unevenness of the roads.

Other objects are simplicity, sturdiness and convenience in facilitating assembling and adjustment. Still other objects and advantages of my invention will hereinafter appear.

In accordance with my inveniton, I provide a frame, which may be of tubular material and which has the usual or suitable means for connection with the motorcycle or other vehicle. Resiliently mounted upon the front and rear cross pieces of the frame, are slings or rests properly shaped to receive the article, which is to be transported. If it be a boat, these rests are of the usual V-shape construction characteristic of launching cradles. In order to adapt the frame to the various lengths of boats or other articles, one of these rest carrying cross members, preferably the rear one, may be adjustable with respect to the other cross member, and for this purpose the side frames are preferably made of telescopic tubular metal members. In order to get the support of the side wheel under the center of the weight of the load, the hub for this side wheel is mounted upon a cross member on the frame that is adjustable longitudinally of the frame. Also the hub bracket may itself be laterally adjustable in this cross member, so as to adjust the width of the carrier and thus accommodate boats or other articles of various widths.

There are various other features of construction and details and arrangement of parts, which are comprehended within my invention and as will appear from the following description of one embodiment thereof. I shall describe herein the illustrated embodiment of my invention and shall thereafter point out my invention in claims.

Figure 1:
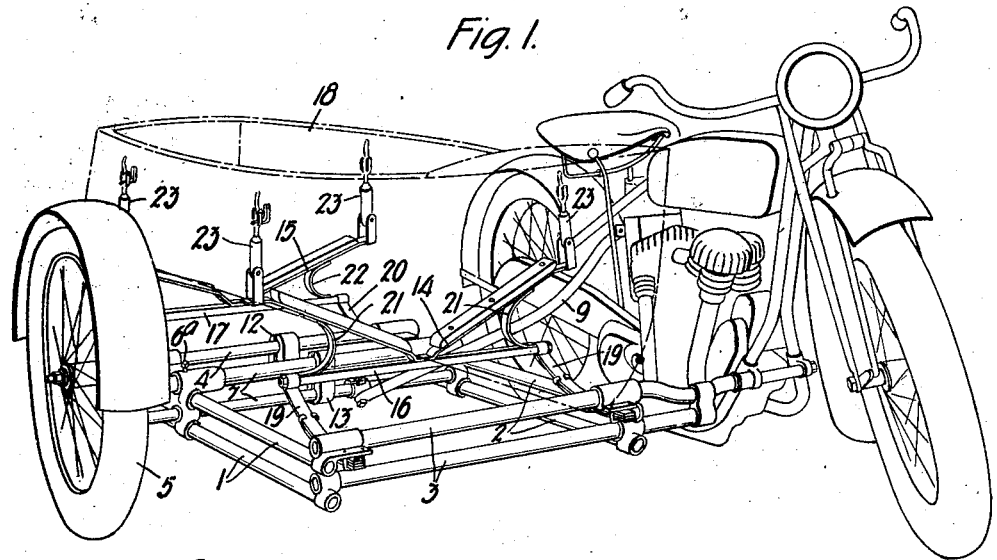
Fig. 1 is a perspective of a motorcycle with my side frame attached and showing in dash and dot lines a boat in position on the frame.
Figure 3:
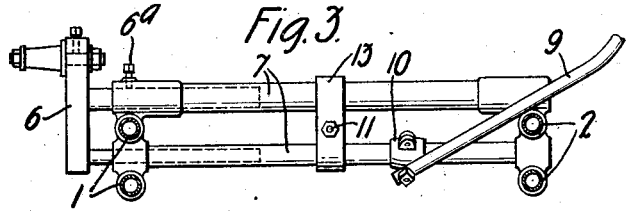
Fig. 3 is a cross section of the side car frame taken just in advance of the side wheel cross member and looking toward the rear.

The side car frame is shown as rectangular and composed of double tubular construction. The double side members 1 and 2 are fastened by suitable fittings to the double front cross member 3. The tubes composing this double front member 3 are continued on the side toward the motorcycle beyond the side members 2 and are shown as terminating in the standard connection with the motorcycle. While this frame may be of rigid construction throughout, yet a preferred embodiment of the invention is seen in the present showing. In this showing, the side members 1 and 2 are made of telescopic sections, there being shown rear sections $1^a$ and $2^a$ respectively, which carry the rear cross section 4 of double tubular construction and which telescope in the rear ends of the tubes composing the side members 1 and 2. In this way, provision is made to vary the length of the frame, i. e. the distance between the cross members 3 and 4, the telescopic sections of the said frames being locked in adjusted position by set screws $1^b$ and $2^b$.

The side wheel 5 is mounted on a hub bracket 6, which, in turn, is carried by a double tubular cross member 7. This hub carrying cross member 7 is slidably mounted by suitable fittings upon the side members 1 and 2 of the frame and locked in adjusted position by set screws $7^a$. The hub bracket 6 has also two lateral arms, which telescope in the outer end of the tubes composing the cross member 7 and this bracket is locked in this laterally adjusted position by a set screw $6^a$. In this way, provision is made to adjust the wheel 5 longitudinally of the frame and also to adjust it laterally and to vary its distance from the side member 1 as required by the width of the boat or other article being transported.

The frame is attached at its rear to the motorcycle through the usual bracket arm 8, which clamps at its inner end around the telescopic section 2ª of the frame. The side car frame is further secured to the motorcycle through a brace 9, which pivots at its one end to a clamp 10 about the lower tube of the cross member 7. This clamp 10 is adjustable longitudinally upon the cross member 7 to permit of the longitudinal adjustment of the cross member 7 upon the frame, the brace member 9 having a fixed pivotal connection at its other end with the motorcycle frame. The cross members 4 and 7 will preferably be tied together at their centers for the sake of rigidity. In the construction shown, this is effected by a rod 11, which is threaded at its ends into clamps 12 and 13 on the cross members 4 and 7 respectively. These are shown as double clamps embracing both tubes of the respective members with the rod 11 passing through the flattened portions of the clamps between the tubes. Nuts on the ends of the rod 11 outside the clamps bear against the outer faces of the clamps. The rod 11 is of sufficient length to permit of the maximum adjustment required between the cross members 4 and 7.

Figure 2:
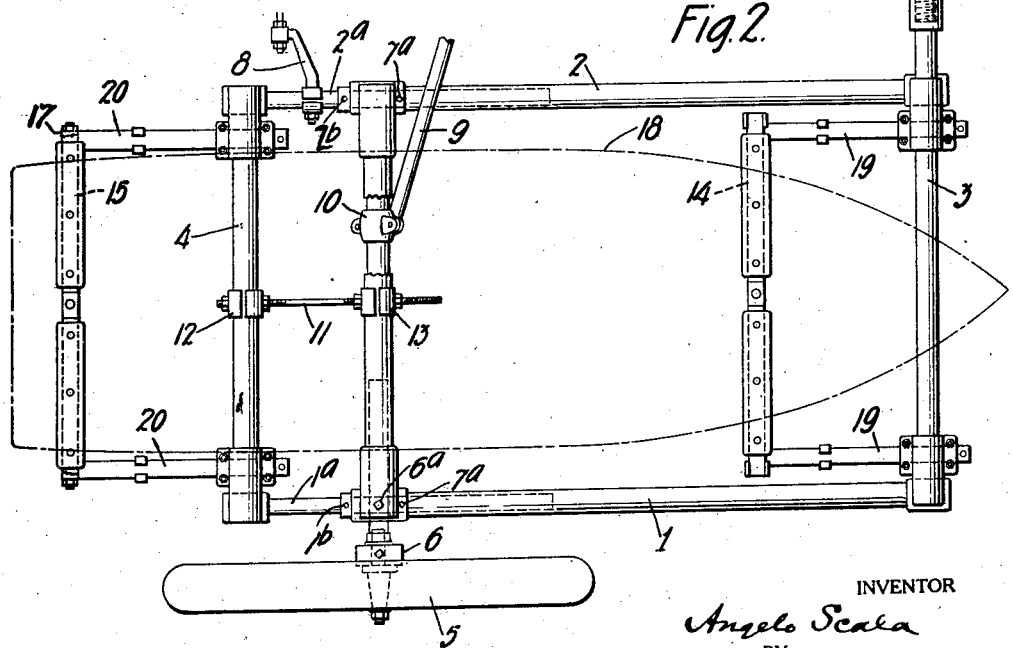
Fig. 2 is a plan of the side car.

The slings or rests for the boat or other article to be transported are connected through a resilient medium to the front and rear cross members 3 and 4. These rests are shown as V-shaped members 14 and 15 connected to their respective cross members, these rests being, therefore, of the proper shape to accommodate a boat 18, such as is shown in dash and dot lines in Figs. 1 and 2. These V-shaped rests 14 and 15 are flat metallic members provided with suitable protective pads on their upper surfaces and attached at their centers to cross bars 16 and 17 respectively, being shown as riveted thereto. These cross bars 16 and 17 are connected to the cross members 3 and 4 by cantilever leaf springs 19 and 20. Further resiliency is afforded by arcuate leaf springs interposed between the outer or free ends of the V-shaped rests 14 and 15 and the ends of the respective cross bars 16 and 17, the two springs for the front rest 14 being numbered 21 and the corresponding springs for the rear rest 15 (only one of which is shown) being numbered 22.

The boat is fastened to its rests in any suitable manner. In the form shown, this is done by spring tensioned clamping means 23 of well-known construction, which fasten to four angular clips or lugs on the sides of the boat.

It is obvious that various modifications may be made in the construction shown in the drawings and above particularly described within the principle and scope of my invention.

What I claim is:—

1. A side car for attachment to motorcycles or the like comprising a frame having means to attach it to the motorcycle, and a hub-carrying cross member for the frame adjustable longitudinally thereon independently of said attachment means.

2. A side car for attachment to motorcycles or the like comprising a frame having means to attach it to the motorcycle, a hub-carrying cross member for the frame adjustable longitudinally thereon independently of said attachment means and a hub supporting bracket carried by the said cross member and laterally adjustable thereon.

3. A side car for attachment to motorcycles or the like comprising a frame having means to attach it to the motorcycle, a hub-carrying cross member for the frame adjustable longitudinally thereon independently of said attachment means, a clamp on the cross member adjustable longitudinally thereof, and a brace for connecting the clamp to the motorcycle having a pivotal connection with the clamp.

4. A side car for attachment to motorcycles or the like comprising a frame including front and rear cross members and telescopically sectioned side members, one section of each side member being fixed and the other adjustable relative to the motorcycle, and one of the cross members being mounted on the fixed sections and the other on the adjustable sections of the side members.

5. A side car for attachment to motorcycles or the like comprising a frame having means to attach it to the motorcycle and including side members and front and rear cross members, a boat rest resiliently carried by said frame and a wheel hub adjustably mounted on the outer side of the frame independently of said attachment means.

6. A side car for attachment to motorcycles or the like comprising a frame having means to attach it to the motorcycle and including side members and front and rear cross members, a V-shaped boat rest resiliently mounted on each of the cross members and a hub-carrying cross member for the frame adjustable longitudinally thereon independently of said attachment means.

7. A side car for attachment to motorcycles or the like comprising a frame having means to attach it to the motorcycle and including side members and front and rear cross members, a V-shaped boat rest resiliently mounted on each of the cross members, a hub-carrying cross member for the frame adjustable longitudinally thereon independently of said attachment means and a hub-supporting bracket carried by the said cross member and laterally adjustable thereon.

8. A side car for attachment to motorcycles or the like comprising a frame including front and rear cross members and telescopically sectioned side members, one section of each side member being fixed and the other adjustable relative to the motorcycle, and one of the cross members being mounted on the fixed sections and the other on the adjustable sections of the side members and a V-shaped boat rest resiliently mounted on each cross member.

9. A side car for attachment to motorcycles or the like comprising a frame including front and rear cross members and telescopically sectioned side members, one section of each side member being fixed and the other adjustable relative to the motorcycle, and one of the cross members being mounted on the fixed sections and the other on the adjustable sections of the side members, a hub-carrying cross member for the frame adjustable longitudinally thereon, and a V-shaped boat rest resiliently mounted on each cross member.

10. A side car for attachment to motorcycles or the like comprising a frame including front and rear cross members and telescopically sectioned side members, one section of each side member being fixed and the other adjustable relative to the motorcycle, and one of the cross members being mounted on the fixed sections and the other on the adjustable sections of the side members, a hub-carrying cross member for the frame adjustable longitudinally thereon, a V-shaped boat rest resiliently mounted on each cross member and a central tie between the rear and hub-carrying cross members permitting relative adjustment between them.

11. In a boat carrying device, a support for the boat comprising a bar supported at its ends from the device by cantilever leaf springs, a strip of meal fastened centrally of the bar and bent upwardly in a vertical plane therewith to form a symmetrical shaped cradle for the bottom of the boat, U-shaped stiffening bars bent up from the bar and fastened beneath the cradle bar at each end.

12. In a boat carrying device, a support for the boat comprising a bar supported at its ends from the device by cantilever leaf springs, a strip of metal fastened centrally of the bar and bent upwardly in a vertical plane therewith to form a symmetrical shaped cradle for the bottom of the boat, U-shaped stiffening bars bent up from the bar and fastened beneath the cradle bar at each end and padding means fastened on the symmetrical wings of said cradle, whereby better contact with the base of the boat is accomplished.

13. In a boat carrying device, a support for the boat comprising a bar supported at its ends from the device by cantilever leaf springs, a strip of metal fastened centrally of the bar and bent upwardly in a vertical plane therewith to form a symmetrical shaped cradle for the bottom of the boat, U-shaped stiffening bars bent up from the bar and fastened beneath the cradle bar at each end, padding means fastened on the symmetrical wings of said cradle, whereby better contact with the base of the boat is accomplished, and spring tensioned fastening means to retain the boat on the cradle.

14. A side car for attachment to motorcycles or the like, comprising a frame having means to attach it to the motorcycle and including side members and front and rear cross members, a boat rest resiliently carried by said frame, means carried by said boat rest for detachably securing a boat thereupon adapted to be readily disengaged and reengaged at will, and a wheel hub mounted on the outside of said frame.

In witness whereof, I hereunto subscribe my signature.

ANGELO SCALA.